No. 674,446. Patented May 21, 1901.
P. MARX.
SPOON.
(Application filed Mar. 12, 1900.)
(No Model.)

Witnesses

Peter Marx,
Inventor
By Edw. S. Duvall, Jr.
his Attorney.

UNITED STATES PATENT OFFICE.

PETER MARX, OF NEW YORK, N. Y.

SPOON.

SPECIFICATION forming part of Letters Patent No. 674,446, dated May 21, 1901.

Application filed March 12, 1900. Serial No. 8,379. (No model.)

*To all whom it may concern:*

Be it known that I, PETER MARX, a citizen of the United States, residing at New York, in the county of New York and State of New York, have invented certain new and useful Improvements in Spoons, of which the following is a specification.

This invention is an improvement in spoons; and the object is to provide an article for combined use as a spoon and as a drinking-tube especially adapted for use in eating a mixture of solid food and liquid, such as ice-cream soda and any other drinkable containing solid substances to be eaten from a glass or the like. Where it is now common to use first a spoon and then a straw, this spoon as constructed in accordance with my invention will serve the purpose of both.

With the above and other objects and advantages in view the invention consists of the novel and useful construction described in the following specification and particularly set forth in the claims annexed hereto.

Figure 1:
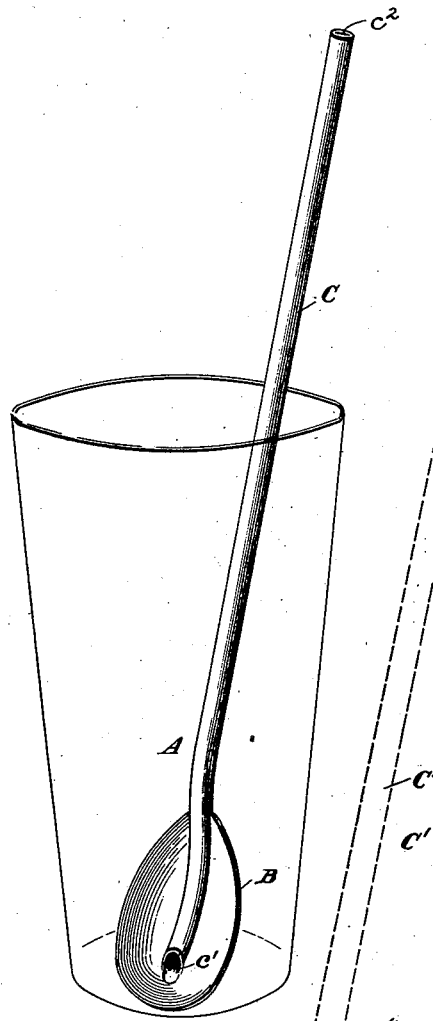
Figure 2:
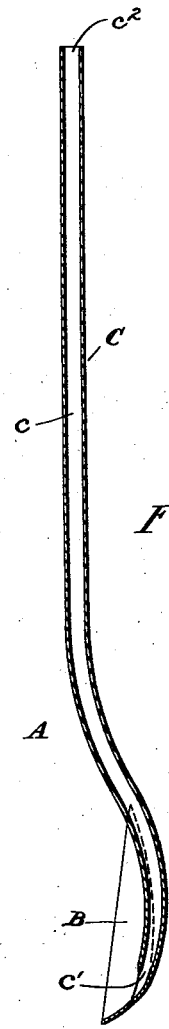
Figure 3:
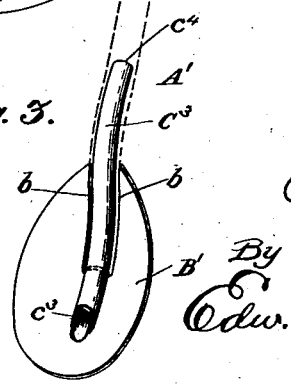

In the drawings illustrating my invention and accompanying and forming a part of this specification, Figure 1 is a perspective view of my improved spoon, showing the same ready for use. Fig. 2 is a longitudinal sectional view of the same. Fig. 3 is a modified form of construction.

Like letters of reference designate like parts in the figures of the drawings.

In constructing the spoon A according to my invention the bowl B is made shallow and open, after the style of such table utensils, and while otherwise it may conform to fancy and be of any preferred shape or design it is in the form illustrated found most convenient for eating and drinking ice-cream soda or other mixtures of drinkables and solids.

The handle C of this spoon is shown as tubular, though it may have any exterior shape, with a passage $c$ therethrough and open at both ends, as $c'$ and $c^2$. This handle may be made integral with the bowl or united thereto in any suitable manner. It extends along the bowl to a point a short distance from the end or tip thereof, where the opening $c'$ communicates with the inside of the same. This handle C serves the purpose of a drinking straw or tube, and its reduced diameter conforms to that of drinking-straws now in general use. Its length may be made equal to that of such straws or any suitable length for table use, and the end with the opening $c'$ being located near the tip of the spoon-bowl B will enable one to drain the contents from the receptacle. Especially for use in drinking ice-cream soda or similar mixtures will this spoon be found most convenient and serviceable. The ice-cream may be eaten with the spoon, after which its handle may be used to drink the soda, taking the place of a paper straw.

It will be apparent that this spoon may be made of celluloid, metal, paper, or other suitable material, and the bowl and handle may be separable, as shown in Fig. 3, so that the bowl may be retained, while the tubular handle may be thrown away after use. As illustrated, the bowl B' is slitted at $b\ b$ for some distance on each side of and contiguous to the short tubular stem $C^3$, which otherwise is similar in construction to the lower part of tube C in Fig. 1, except that it tapers toward the upper end to snugly fit in the end of a thick paper straw $C^2$, which forms a handle and spoon similar to the article in Fig. 1. This bowl may be made of celluloid or papier-mâché and attached to the ordinary rolled paper straw, and after use both may be thrown away, or the bowl may be made of metal and preserved to be attached to paper straws, the latter being thrown away each time.

Having thus fully described my invention, what I claim as new, and desire to secure by Letters Patent of the United States, is—

1. In an eating and drinking spoon, a spoon-bowl shaped for eating purposes in combination with a spoon-handle and a duct or passage connecting the tip or end of the handle with the inside of the spoon-bowl, substantially as described.

2. In an eating-spoon the combination with a concaved spoon-bowl, of a tubular handle for said bowl, and an opening in the bottom of said bowl, near the tip or lower end, communicating with the passage in the handle.

3. In an eating and drinking spoon, a spoon-bowl shaped for eating purposes in combination with a spoon-handle and a duct or passage connecting the end of the handle with the inside of the spoon-bowl, through an opening near the tip or end thereof, substantially as described.

4. As a new article of manufacture, a spoon comprising a concaved spoon-bowl, and a handle for said bowl provided with a passage throughout its length, communicating with an opening in the bottom of said bowl, near the tip or lower end.

5. In an eating-spoon, the combination with a concaved spoon-bowl, having a short, tubular stem communicating with the interior of the bowl through an opening, slits in the bowl, contiguous to the tubular stem, and a tubular handle adapted to fit upon the said stem within the slits.

In testimony whereof I affix my signature in presence of two witnesses.

PETER MARX.

Witnesses:
   EVELYN S. SHARP,
   SAMUEL BRUCKHEIMER.